(12) United States Patent
Jin et al.

(10) Patent No.: US 6,348,270 B1
(45) Date of Patent: Feb. 19, 2002

(54) HIGH PERFORMANCE POLYETHERESTER CONTAINING LAMINATING RESIN COMPOSITIONS

(75) Inventors: Lixin Jin, Raleigh; Hildeberto Nava, Cary, both of NC (US)

(73) Assignee: Reichhold Inc., Durham, NC (US)

( * ) Notice: Subject to any disclaimer, the term of this patent is extended or adjusted under 35 U.S.C. 154(b) by 0 days.

(21) Appl. No.: 09/652,252

(22) Filed: Aug. 30, 2000

Related U.S. Application Data

(60) Provisional application No. 60/151,849, filed on Sep. 1, 1999.

(51) Int. Cl.[7] .................... B32B 27/00; C08G 63/48
(52) U.S. Cl. .................... 428/480; 525/31; 525/41; 525/43; 525/44; 525/168; 525/438; 525/445; 524/424; 524/442
(58) Field of Search ................ 525/31, 41, 43, 525/44, 168, 438, 445; 428/480; 524/424, 442

(56) References Cited

U.S. PATENT DOCUMENTS

| | | | |
|---|---|---|---|
| 3,179,623 A | 4/1965 | Bowen | 260/47 |
| 3,256,226 A | 6/1966 | Fekete et al. | 260/23.5 |
| 3,301,743 A | 1/1967 | Fekete et al. | 161/194 |
| 3,367,992 A | 2/1968 | Bearden | 260/837 |
| 4,419,487 A | 12/1983 | Rowe | 525/38 |
| 4,424,299 A | 1/1984 | Penczek et al. | 525/31 |
| 4,483,963 A | 11/1984 | Meyer | 525/44 |
| 4,753,982 A | 6/1988 | Hefner, Jr. | 525/31 |
| 4,895,895 A | 1/1990 | Osborne et al. | 525/28 |
| 4,916,023 A | 4/1990 | Kawabata et al. | 428/482 |
| 4,918,120 A | 4/1990 | Vanderlaan et al. | 523/465 |
| 5,102,605 A | 4/1992 | Kagaya et al. | 264/257 |
| 5,202,366 A | 4/1993 | Reid et al. | 523/516 |
| 5,266,084 A | 11/1993 | Baillargeon et al. | 44/393 |
| 5,319,006 A | 6/1994 | Yang et al. | 523/500 |
| 5,436,313 A | 7/1995 | Klang et al. | 528/274 |
| 5,436,314 A | 7/1995 | Yang et al. | 528/274 |
| 5,569,737 A | 10/1996 | Yang et al. | 528/274 |
| 5,610,205 A | 3/1997 | Yang et al. | 522/102 |
| 5,612,444 A | 3/1997 | Cai et al. | 528/274 |
| 5,677,396 A | 10/1997 | Klang | 525/445 |
| 5,684,086 A | 11/1997 | Yang et al. | 525/49 |
| 5,696,225 A | 12/1997 | Cai et al. | 528/297 |
| 5,719,213 A | 2/1998 | Kicko-Walczak et al. | 523/508 |
| 5,770,659 A | 6/1998 | Cai et al. | 525/438 |
| 5,780,558 A | 7/1998 | Klang et al. | 525/445 |

FOREIGN PATENT DOCUMENTS

| | | |
|---|---|---|
| EP | 0277735 A2 | 8/1988 |
| EP | 0340019 A2 | 11/1989 |
| EP | 0755976 A1 | 1/1997 |
| JP | 62-7711 A | 1/1987 |
| JP | 62-7712 A | 1/1987 |

OTHER PUBLICATIONS

International Search Report, PCT/US00/24131, Date of Mailing: Dec. 12, 2000.

Primary Examiner—Samuel A. Acquah
(74) Attorney, Agent, or Firm—Myers Bigel Sibley & Sajovec

(57) ABSTRACT

A polyetherester-based laminating resin composition includes an unsaturated polyetherester resin, and an epoxy acrylate oligomer. The laminating resin has no greater than about 35 percent by weight of ethylenically unsaturated monomer.

20 Claims, No Drawings

HIGH PERFORMANCE POLYETHERESTER CONTAINING LAMINATING RESIN COMPOSITIONS

CROSS-REFERENCE TO RELATED APPLICATIONS

The application claims priority to Provisional Application Ser. No. 60/151,849 filed Sep. 1, 1999, the disclosure of which is incorporated herein by reference in its entirety.

FIELD OF THE INVENTION

The present invention generally relates to resin compositions for use in laminating applications.

BACKGROUND OF THE INVENTION

Polyetherester resins are a relatively new type of thermosetting resins being considered for use in a number of applications that have traditionally employed polyester and vinyl ester resins. Such applications include products for use in marine, transportation, and building industries, corrosion resistant products, as well as fiber or particulate reinforced products such as glass fiber reinforced laminate-type products.

Examples of processes for making polyetheresters are described in U.S. Pat. Nos. 5,319,006; 5,436,313; and 5,436,314. By adjusting the proportion of anhydride to polyol, the average polyether chain length between ester linkages and the crosslinkability of the polyester ether can be controlled. The viscosity and styrene content of a polyetherester resin are generally lower in comparison to conventional polyester resins containing isophthalic and terephthalic acids.

Notwithstanding any of the above efforts, physical properties of the polyetherester resins are typically not acceptable. Cured polyetherester thermoset resins often exhibit poor heat deflection temperatures under load (HDT), poor tensile and flex properties, and, more importantly, poor water resistance properties. Although not wishing to be bound by any theory, it is believed that these inferior properties are attributable to the fact that the polyetherester resins typically contain a high concentration of flexible and somewhat hydrophilic polyether linkages and a relatively low amount of rigid and hydrophobic aromatic ring structures on the polymer chain.

In view of the above, several attempts have been proposed to incorporate aromatic structures into the polyetheresters, typically by employing isophthalic acid. Examples of these attempts are described in U.S. Pat. Nos. 5,569,737; 5,610,205; 5,436,314; and 5,612,444. In spite of any potential benefits, there are several drawbacks to these processes. For example, it is often difficult to achieve a high reaction conversion. Moreover, it is difficult to obtain a resin having a low acid number (i.e., less than 30). A resin having a high acid number and a sizeable amount of carboxylic acid end groups can cause the cured resin to be excessively water sensitive and thus deteriorate quickly in aqueous or caustic conditions. It is believed that in order to potentially obtain a desirable balance of reactivity and physical properties, a relatively large amount of saturated aromatic esters should be incorporated in the polyetherester polymer chain. However, employing such aromatic groups often results in an increase in resin viscosity. Moreover, the tensile and flex properties and the heat distortion temperatures of the cured thermosets having aromatic groups are typically lower relative to a conventional polyester formed from isophthalic acid.

Attempts at reducing the acid number and improving the performance of the polyetherester resins have been proposed in U.S. Pat. Nos. 696,225 and 5,770,659. These patents generally propose methods of making polyetherester resins via chain extension of the polyetherester intermediate with a primary diol or an epoxy resin. These efforts, however, also suffer from potential drawbacks. For example, the molecular weight and thus the viscosity of the final resin typically increases dramatically as a result of the chain extension requiring higher levels of diluents to decrease such viscosities. These resins, and especially epoxy-modified polyetheresters, are thought to be particularly undesirable for VOC applications. Moreover, in order to reduce the resin acid number to below 30 and obtain adequate physical and chemical resistant properties, a relatively large quantity of epoxy is needed, typically more than 20 weight percent. Because such an epoxy is typically a very expensive raw material, this approach may not be attractive from a cost standpoint.

Other methods of forming modified polyetherester resins are proposed in U.S. Pat. Nos. 5,684,086 and 5,780,558. These references propose reacting dicyclopentadiene (DCPD) into the polymer backbone or blending DCPD with a polyetherester resin. This proposed technique is potentially a more cost effective technique at providing cured thermoset resins with improved strength properties. Nonetheless, these resins potentially display other inferior properties, particularly with respect to chemical resistance. The problems with these resins may be attributable to both DCPD and polyetherester resins exhibiting poor chemical resistance. Moreover, since a high level of DCPD resin is typically needed to provide adequate blend performance, an excess of DCPD may result in a thermoset resin that is very brittle.

In view of the above, there is a need in the art for a more cost-effective laminating resin that employs a reduced level of ethylenically unsaturated monomer (e.g., styrene) while displaying a desirable range of physical properties, particularly with respect to strength and chemical resistance.

SUMMARY OF THE INVENTION

In response to the above need and others, the present invention provides a polyetherester-based laminating resin composition. The composition comprises an unsaturated polyetherester resin and an epoxy acrylate oligomer. Advantageously, the composition comprises no greater than about 35 percent by weight of ethylenically unsaturated monomer while providing good physical properties particularly with respect to strength, toughness, and corrosion resistance.

The invention also provides an article of manufacture. The article of manufacture comprises the laminating resin composition and a fibrous substrate.

DETAILED DESCRIPTION OF PREFERRED EMBODIMENTS

The invention will now be described in greater detail with respect to the preferred embodiments set forth herein below. It should be appreciated however that these embodiments are for illustrative purposes only, and that the scope of the invention is defined by the claims.

In one aspect, the invention relates to a polyetherester-based or—containing laminating resin composition. The laminating resin composition comprises an unsaturated polyetherester resin and an epoxy acrylate oligomer. The laminating resin comprises no greater than about 35 percent by weight of ethylenically unsaturated monomer. The laminating resin composition is thermosettable. The components of the laminating resin composition are preferably present in the form of a blend or mixture.

Any number of polyetherester resins may be used in the composition of the invention. Examples of unsaturated polyetherester resins and methods of making these materials are set forth in U.S. Pat. Nos. 5,696,225; 5,677,396; 5,436,313; and 5,319,006, the disclosures of which are incorporated herein by reference in their entirety. As an illustration, a polyetherester may be formed from a polyether reacting with an anhydride in the presence of a catalyst such as, for example, a protic acid or a metal salt of a protic acid, or a Lewis acid, in an amount suitable to promote insertion of the anhydride into the carbon-oxygen double bonds of the polyether to produce a polyetherester.

Polyethers suitable for use in the invention are preferably those derived from base or acid-catalyzed ring-opening polymerization of cyclic ethers such as epoxides, oxetanes, oxolanes, and the like. The polyethers have repeat units of oxyalkylene groups (—O—A—) in which A preferably has from 2 to 10 carbon atoms, more preferably 2 to 4 carbon atoms. The polyethers can have different end groups, depending upon how the polyethers are made or modified. For example, the polyether can have hydroxyl, ester, ether acid, olefinic, or amino end groups, or the like, or combinations of these. Mixtures of different types of polyethers can be used.

Preferred polyethers are polyether polyols. Examples of polyether polyols include, but are not limited to, polyoxypropylene polyols, polyoxyethylene polyols, ethylene oxide-propylene oxide copolymers, polytetramethylene ether glycols, oxetane polyols, and copolymers of tetrahydrofuran and epoxides. Typically, these polyols with have average hydroxyl functionalities from about 2 to about 8.

Anhydrides that can be employed in the making of a polyetherester are preferably cyclic or acyclic, saturated or unsaturated. In a "cyclic" anhydride, the anhydride functionality is contained within a ring, such as in phthalic anhydride and maleic anhydride. "Acyclic" anhydrides, which include acetic anhydride, propionic anhydride, and the like, have no such ring. "Saturated" anhydrides contain no ethylenic unsaturation, although they may contain aromatic rings. Phthalic anhydride, propionic anhydride, and succinic anhydride are examples of saturated anhydrides. "Unsaturated" anhydrides contain ethylenic unsaturation. This unsaturation typically becomes incorporated into the polyetherester, and can be used for crosslinking. Examples include maleic anhydride, itaconic anhydride, and the like.

Specific examples of suitable anhydrides include, but are not limited to, acetic anhydride, propionic anhydride, maleic anhydride, phthalic anhydride, succinic anhydride, tetrahydrophthalic anhydride, citraconic anhydride, itaconic anhydride, and aryl-, alkyl-, and halogen-substituted derivatives of the above. Mixtures of these anhydrides may be used. The selection of the amounts of polyether and anhydride that may be used can be determined by the end user, and may depend, for example, upon the types of physical properties or degree of crosslinking that is desired.

The polyetherester resins of the invention preferably have a reduced number of saturated aromatic ester groups, preferably less than about 20 percent based on the number of unsaturated ester groups in the polyetherester resin and more preferably less than about 10 percent. The laminating resin composition may comprise various levels of polyetherester resin. Preferably, the laminating resin composition comprises from about 10 to about 70 percent by weight of the unsaturated polyetherester resin, and more preferably from about 20 to about 50 percent by weight.

Epoxy acrylate oligomers that are employed in the composition of the invention are known to those who are skilled in the art. As an example, the term "epoxy acrylate oligomer" may be defined for the purposes of the invention as a reaction product of acrylic acid and/or methacrylic acid with an epoxy resin. An anhydride (e.g., methacrylic anhydride) may also be employed with any of the above reactants in the formation of the epoxy acrylate oligomer. Examples of processes involving the making of epoxy acrylates can be found in U.S. Pat. Nos. 3,179,623; 3,367,992; 3,301,743; 3,256,226; the disclosures of which are incorporated herein by reference in its entirety. Epoxy resins that may be employed are known and include virtually any reaction product of a polyfunctional halohydrin, such as, but not limited to, epichlorohydrin, with a phenol or polyhydric phenol. Examples of phenols or polyhydric phenols include, but are not limited to, resorcinol, tetraphenol ethane, and various bisphenols such as Bisphenol-A, 4,4'-dihydroxy biphenyl, 4,4'-dihydroxydiphenylmethane, 2,2'-dihydroxydiphenyloxide, phenol or cresol formaldehyde condensates and the like. Mixtures of any of the above can be used. The preferred epoxy resins employed in forming the epoxy acrylates are those derived from bisphenol A, bisphenol F, especially preferred are their liquid condensates with epichlorohydrin having a molecular weight preferably in the range of from about 300 to about 800. The preferred epoxy acrylates that are employed of the general formula:

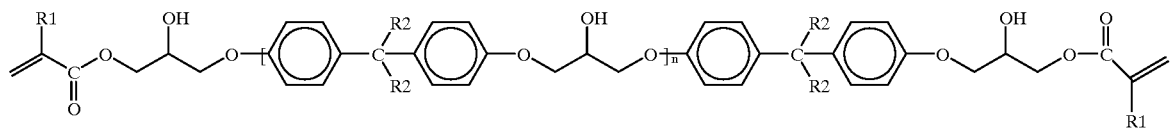

where R1 and R2 is H or $CH_3$ and n ranges from 0 to 1, more preferably from 0 to 0.3.

Other examples of epoxy acrylate oligomers that may be used include comparatively low viscosity epoxy acrylates. As an example, these materials can obtained by reaction of epichlorohydrin with the diglycidyl ether of an aliphatic diol or polyol. In a preferred embodiment, epoxy acrylates of the general formula can be used:

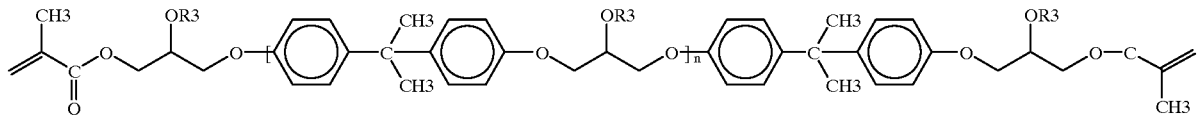

wherein $R_3$ is H, an aliphatic, cycloaliphatic or aromatic group containing $C_1$ to $C_{40}$ linear or branched, α,β-unsaturated straight or branched alkenyl or alkynyl, and may contain a group selected from $C_1$–$C_{20}$, Br, I, $OR_4$, C(=O), OP(=O)$R_5$, OP(=O)(O$R_5$)$_2$, OP(=O)O$R_5$; wherein $R_4$ is an alkyl from 1 to 20 carbon atoms in which each of the hydrogen atoms may be independently replaced by a halide; $R_5$ is aryl or straight or branched $C_1$–$C_{20}$ alkyl group, and wherein the two $R_5$ groups may be joined to form a 5- to 6-member heterocyclic ring, O, S, C(=O) or S(=O)$_2$. As an example, suitable polyfunctional acrylates may include those described in ACS Polymer Preprints Vol. 38, page 84, 1997. A particularly preferred reaction involves a diepoxy, methacrylic anhydride, and methacrylic acid. A preferred diepoxy in this reaction is of the formula:

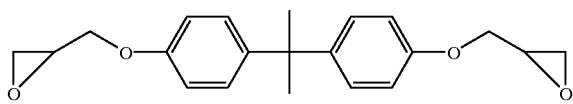

A particularly preferred epoxy acrylate oligomer is an epoxy (meth)acrylate oligomer. Various quantities of epoxy acrylate oligomer may be used. Preferably, the laminating resin composition comprises from about 5 to about 50 percent by weight of epoxy acrylate monomer, and more preferably from about 20 to about 50 percent by weight.

In one embodiment, the laminating resin composition may further include a dicyclopentadiene (DCPD) resin. DCPD resins used in the composition of the invention are known to those skilled in the art. These resins are typically DCPD polyester resins and derivatives which may be made according to various accepted procedures. As an example, these resins may be made by reacting DCPD, ethylenically unsaturated dicarboxylic acids, and compounds having two groups wherein each contains a reactive hydrogen atom that is reactive with carboxylic acid groups. DCPD resins made from DCPD, maleic anhydride phthalic anhydride, isophthalic acid, terephthalic acid, adipic acid, water, and a glycol such as, but not limited to, ethylene glycol, propylene glycol, diethylene glycol, neopentyl glycol, dipropylene glycol, and poly-tetramethylene glycol, are particularly preferred for the purposes of the invention.

If employed, the DCPD resin may be used in various amounts in the laminating resin composition of the invention. Preferably, the laminating resin composition comprises from about 5 to about 50 weight percent of DCPD resin, and more preferably from about 20 to about 40 weight percent. Preferably, the DCPD resin has a number average molecular weight ranging from about 450 to about 1500, and more preferably from about 500 to about 1000. Additionally, the DCPD resin preferably has a ethylenically unsaturated monomer content of below 35 percent at an application viscosity of 500 cps.

In the event that the laminating resin composition employs an ethylenically unsaturated monomer such as, for example, a vinyl monomer, the laminating resin comprises no greater than about 35 percent by weight of such monomer. Applicants believe that employing no greater than 35 percent by weight of such a monomer may be potentially advantageous from an environmental standpoint relative to conventional resins. As known, the potential risk of any monomer often depends on various processing conditions relating to, for example, temperature, pressure, and monomer concentration. As an example, OSHA has suggested an allowable 8 hours time weight average styrene exposure level of 50 ppm. Such monomers may include those such as, for example, styrene and styrene derivatives such as alpha-methylstyrene, p-methyl styrene, divinyl benzene, divinyl toluene, ethyl styrene, vinyl toluene, tert-butyl styrene, monochlorostyrene, dichlorostyrene, vinyl benzyl chloride, fluorostyrene, and alkoxystyrenes (e.g., paramethoxystyrene). Other monomers which may be used include, for example, diallyl phthalate, hexyl acrylate, octyl acrylate, octyl methacrylate, diallyl itaconate, diallyl meleate, hydroxyethyl acrylate, hydroxyethyl methacrylate, and hydroxypropyl methacrylate. Mixtures of the above may also be employed.

The laminating resin composition may also include other monomers if desired. For example, a suitable polyfunctional acrylate may be used in the laminating resin composition, including those described, for example, in U.S. Pat. No. 4,916,023 to Kawabata et al., the disclosure of which is incorporated by reference herein in its entirety. Such compounds include, but are not limited to, ethylene glycol (EG) dimethacrylate, butanediol demethacrylate, hydroxypropyl methacrylate, hydroxyethyl methacrylate, and the like. The polyfunctional acrylate which may be used in the present invention can be represented by the general formula:

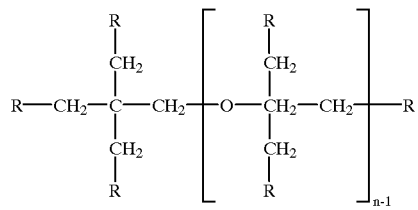

wherein at least four of the represented R's present are (meth)acryloxy groups, with the remainder of the R's being an organic group except (meth)acryloxy groups, and n is an integer from 1 to 5. Examples of polyfunctional acrylates include ethoxylated trimethyolpropane triacrylate, trimethyolpropane tri(meth)acrylate, trimethyolpropane triacrylate, trimethylolmethane tetra (meth)acrylate, pentaerythritol tetra(meth)acrylate, dipentaerythritol tetra(meth)acrylate, dipentaerythritol penta(meth)acrylate, and dipentaerythritol hexa(meth) acrylate. Mixtures of any of the above may be used in the laminating resin.

The laminating resin composition may include an agent such as an organic peroxide compound to facilitate curing of the composition. Exemplary organic peroxides may be used and include, for example, cumene hydroperoxide, methyl ethyl ketone peroxide, benzoyl peroxide, acetyl acetone peroxide, 2,5-dimethylhexane-2,5dihydroperoxide, tert-butyl peroxybenzoate, di-tert-butyl perphthalate, dicumylperoxide, 2,5-dimethyl-2,5-bis(tert-butylperoxy) hexane, 2,5dimethyl-2,5bis(tert-butylperoxy)hexyne 3, bis (tert-butylperoxyisopropyl)benzene di-tert-butyl peroxide, 1,1-di(tert-amylperoxy)-cyclohexane, 1,1-di-(tert-butylperoxy)-3,3,5-trymethylcyclohexane, 1,1-di-(tert-butylperoxy)-cyclohexane, 2,2-di-(tert-butylperoxy)-butane, n-butyl 4,4di-(tert-butylperoxy)-valerate, ethyl 3,3-di-(tert-amylperoxy)-butyrate, ethyl 3,3-di-(tert-butylperoxy)-butyrate and the like. Mixtures of any of the above may be used. The agent is preferably employed in an amount from about 1 to 5 percent based on the weight of the laminating resin, more preferably from about 1 to 3 percent by weight, and most preferably from about 1 to 2 percent by weight.

Suitable curing accelerators or promoters may also be used and include, for example, cobalt naphthanate, cobalt octoate, N,N-dimethyl aniline, N,N-dimethyl acetamide, and N,N-dimethyl para-toluidine. Mixtures of the above may be used. These materials may be used in levels that may be determined by the end user.

Additional additives known by the skilled artisan may be employed in the laminating resin composition of the present invention including, for example, paraffins, fatty acids, fatty acid derivatives, lubricants, and shrink-reducing additives. Various percentages of these additives can be used in the laminating resin composition.

In another aspect, the invention relates to an article of manufacture. The article of manufacture may be a product which employs a laminating resin, and typically includes marine vessels, vehicles, and aircraft. More specifically, the article includes a substrate with the laminating resin composition coated thereon. The substrate may be made of any appropriate material and typically includes fibrous reinforced material such as those formed of thermoset or thermoplastic resins. The fibers which may be used typically include, but are not limited to, fibrous glass, carbon fibers, aromatic polyamide fibers, inorganic fibers, and the like.

The laminating resin composition may be prepared in accordance with various suitable processes known in the art and described further herein. Preferably, blends or mixtures of the invention may be prepared by combining a polyetherester resin with at least one epoxy acrylate oligomer. In certain embodiments, a DCPD resin may be included in the blend or mixture. As an example, the epoxy acrylate oligomer(s) can be either in monomer free liquid form or as a solution in a diluent such as, for example, styrene. Due to the typically excellent miscibility of the epoxy acrylate oligomer(s) with the polyetherester resin and also, if employed, DCPD resin, effective mixing can usually be accomplished by mixing either form of the epoxy acrylate oligomer(s) described above into the polyetherester resin, and DCPD resin if employed, namely the epoxy acrylate being monomer free or being present in a diluent. Employing conventional mixing equipment operating at ambient conditions is usually sufficient for the purposes of the invention.

In another aspect, the invention relates to a method of forming an article of manufacture. The method comprises applying a laminating resin composition described herein to a fibrous substrate to form an article of manufacture. The laminating resin composition may be applied to the fibrous substrate by a suitable method such as coating (e.g., spraying or brushing) to the substrate so as to form a coat. The processing conditions for applying the laminating resin composition along with the resulting thickness of the resin on the substrate may be selected according to the specific criteria of a person skilled in the art.

The laminating resin compositions of the invention may be used in a number of applications. Examples of suitable applications include, but are not limited to, corrosion resistant resins, Sheet Molding Compounding (SMC) resins, castings resins, radiation curable resins, pultrusion resins, gel coats, filament winding resins, hand lay-up, resin transfer molding, and prepregs.

The following examples are provided to illustrate the present invention, and should not be construed as limiting thereof.

EXAMPLE 1

A polyetherester resin, 3700M, available from Lyondell Chemicals Inc. of Houston, Tex. was prepared from 1100 grams of ARCOL® LG-56 (PO-based polyether triol with 3000 molecular weight and a hydroxy number of 58 mg KOH/g), 308 grams of propylene glycol, 792 maleic anhydride, 172 grams of 1,3 methyl propandiol and 1.6 grams of p-toluene sulfonic acid as catalyst.

EXAMPLE 2

A dicylcopentadiene (DCPD) resin, Polylite® 44014-00, available from Reichhold Inc. of Durham, N.C., was prepared from 2.0 moles of maleic anhydride, 2.0 moles of DCPD and 1.0 moles of ethylene glycol.

EXAMPLE 3

A epoxy methacrylate resin, DION VER® 44070-00, available from Reichhold Inc. was prepared from a 1 moles of diglycidyl ether of bisphenol A and 2 mole of methacrylic acid.

EXAMPLE 4

A epoxy acrylate resin, Epotuf® 91-275, available from Reichhold Inc. was prepared from 1 moles of a diglycidyl ether of bisphenol A and 2 moles of acrylic acid.

EXAMPLES 5–18

Examples 5–18 represent various homogeneous polymer solutions of the invention formed from resins described in Examples 1–4. The amounts listed are on a parts per hundred weight basis. In particular, the 35 percent styrene content resin solutions of Examples 1–4 were mixed according to the proportion shown in Table 1 to form homogeneous polymer solutions. The physical properties of the cured thermosets, as measured by ASTM procedures D638 and D790, appear in Table 2.

TABLE 1

| Example # | Example 1 | Example 2 | Example 3 | Example 4 |
|---|---|---|---|---|
| 5 | 100 | | | |
| 6 | 50 | 50 | | |
| 7 | 42 | | | 58 |
| 8 | 50 | | 50 | |
| 9 | 37 | 36 | | 27 |
| 10 | 28 | 36 | | 36 |
| 11 | 40 | 40 | 20 | |
| 12 | 50 | 30 | 20 | |
| 13 | 50 | 20 | 30 | |
| 14 | 40 | 20 | 40 | |
| 15 | 30 | 30 | 40 | |
| 16 | 30 | 40 | 30 | |
| 17 | 20 | 40 | 40 | |
| 18 | 30 | 20 | 50 | |

COMPARATIVE EXAMPLE 19

An isophthalic resin, DION ISO® 6631, available from Reichhold Inc. was prepared from 1.0 moles of isophthalic acid, 1.0 moles of maleic anydride and 2.0 moles of propylene glycol. The resin contains 48% styrene with a viscosity of 400 cps.

Physical property data of the resin is presented in Table 2. As shown, the resins of the invention generally display much lower viscosity values and generally display improved properties relative to the resin of Example 5 and Example 6, which are pure polyetherester resins and polyetherester blends with DCPD resin. The resins of the invention also display comparable properties relative the resin of Example 19 while employing less styrene.

TABLE 2

| Example # | Visc. | Tensile St. Kpsi | Tensile Mo. Kpsi | Flexural St. Kpsi | Flexural Mo. kpsi | Elongation (%) | HDT (F) |
|---|---|---|---|---|---|---|---|
| 5 | 788 | 6.4 | 313 | 13.5 | 341 | 4.1 | 190 |
| 6 | 550 | 8.9 | 369 | 15.4 | 418 | 4 | 198 |
| 7 | 320 | 10.3 | 442 | 20 | 479 | 6.1 | 202 |
| 8 | 410 | 9.76 | 446 | 16.6 | 485 | 3.7 | 225 |
| 9 | 200 | 11.2 | 430 | 20 | 491 | 4.5 | 222 |
| 10 | 260 | 11.5 | 452 | 22 | 542 | 4.7 | 216 |
| 11 | 400 | 10.2 | 421 | 18.1 | 493 | 3.5 | 210 |
| 12 | 470 | 10.3 | 401 | 17.8 | 484 | 3.3 | 227 |
| 13 | 430 | 10.3 | 387 | 17.1 | 477 | 4.7 | 213 |
| 14 | 358 | 10.2 | 429 | 19.5 | 501 | 3.5 | 227 |
| 15 | 312 | 11.2 | 427 | 20.3 | 513 | 4.1 | 213 |
| 16 | 345 | 10.7 | 432 | 19.2 | 515 | 3.3 | 219 |
| 17 | 272 | 10.5 | 452 | 20.6 | 536 | 2.9 | 225 |
| 18 | 300 | 10.9 | 430 | 19.6 | 517 | 4.0 | 220 |
| 19 | 400 | 10.5 | 540 | 16.6 | 555 | 2.5 | 217 |

EXAMPLES 20–28

Examples 20–28 relate to laminate panels constructed using conventional hand lay-up techniques with 0.15–0.25 weight percent cobalt hexane (12 percent), and 0.1 weight percent dimethylaniline from the resin blends of Examples 11–19. Example 20 is the laminates prepared from the blend of Example 11, Example 21 from the blend of Example 12, and so on. The promoted resins were catalyzed with 1.25 percent of methyl ethyl ketone peroxide. The laminates consist of three plies of 1.5 oz/ft$^2$ chopped strand mat (CSM) with a targeted glass content of 30 percent. All laminates were post cured for 2 hours at 200° F.(93° C.) and 2 hours at 250° F.(121° C.).

Physical property data for the laminate panels are set forth in Table 3. As can be seen, the panels display good properties.

TABLE 3

| Example # | Tensile St. Kpsi. | Tensile Mo. Kpsi. | Flexural St. Kpsi. | Flexural Mo. Kpsi. | Elongation (%) |
|---|---|---|---|---|---|
| 20 | 12.3 | 118 | 26 | 111 | 1.7 |
| 21 | 12.8 | 113 | 25.5 | 105 | 1.5 |
| 22 | 12.4 | 115 | 25.1 | 107 | 1.4 |
| 23 | 13.1 | 118 | 26.8 | 115 | 1.5 |
| 24 | 12 | 114 | 26.3 | 117 | 1.4 |
| 25 | 12.9 | 117 | 27.4 | 121 | 1.6 |
| 26 | 11.8 | 124 | 24.6 | 115 | 1.3 |
| 27 | 12.3 | 122 | 26.4 | 118 | 1.2 |
| 28 | 12.4 | 120 | 22.2 | 109 | 1.2 |

A corrosion study was also performed on Examples 6, 8, and 11–19 according to ASTM C581 method. The following media were used for the study; A) 100 percent deionized water at 140° F.(60° C.), B) 25% sulfuric acid at 140° F. (60° C.), C) 15 percent Hydrochloric acid at 140° F.(60°C), D) 5 percent sodium hydroxide at 77° F.(25° C.), E) 5.25 percent sodium hypochlorite at 77° F. (25° C.), F) PH 10 solution at 140° F.(60° C.). The flexural strength data of the blends before immersion and after 90 days of immersion in different media is shown in Table 4. The flexural modulus data is shown in Table 5. As shown, the resins of the invention display improved property retention relative to the resins of Example 6, and good property retention relative to Example 19 while employing less styrene.

TABLE 4

Flexural Strength Data (psi)

| Example # | Before Immersion | 90 Days Medium A | 90 Days Medium B | 90 Days Medium C | 90 Days Medium D | 90 Days Medium E | 90 Days Medium F |
|---|---|---|---|---|---|---|---|
| 8 | 14554 | 14370 | 14862 | 15040 | 15013 | 13217 | 14108 |
| 11 | 14,468 | 14,444 | 14,217 | 14,650 | 16,055 | 15,652 | 13,899 |
| 12 | 13,572 | 9,781 | 14,421 | 14,806 | 17,512 | 13,188 | 11,938 |
| 13 | 16,072 | 13,344 | 18,358 | 16,390 | 17,331 | 17,727 | 14,138 |
| 14 | 14,103 | 14,822 | 14,890 | 15,996 | 15,183 | 14,603 | 15,012 |
| 15 | 16,035 | 15,020 | 15,839 | 16,653 | 19,893 | 16,105 | 17,174 |
| 16 | 18,041 | 14,674 | 16,209 | 14,163 | 14,421 | 15,545 | 13,937 |
| 17 | — | 14,777 | 15,781 | 16,782 | 18,178 | 17,905 | 15,842 |
| 18 | 18,229 | 14,857 | 17,151 | 18,132 | 15,738 | 16,255 | 14,478 |
| 19 | 16,220 | 14,016 | 15,533 | 14,636 | 14,299 | 16,333 | 12,139 |
| 6 | 17433 | 10723 | 11745 | 17790 | 19047 | 19550 | 12080 |

TABLE 5

Flexural Modulus Data (psi)

| Example # | Before Immersion | 90 Days Medium A | 90 Days Medium B | 90 Days Medium C | 90 Days Medium D | 90 Days Medium E | 90 Days Medium F |
|---|---|---|---|---|---|---|---|
| 8 | 6.9 | 5.67 | 6.61 | 6.48 | 6.34 | 6.30 | 5.47 |
| 19 | 8.03 | 8.38 | 8.12 | 7.51 | 8.34 | 7.93 | 8.21 |

TABLE 5-continued

Flexural Modulus Data (psi)

| Example # | Before Immersion | 90 Days Medium A | 90 Days Medium B | 90 Days Medium C | 90 Days Medium D | 90 Days Medium E | 90 Days Medium F |
|---|---|---|---|---|---|---|---|
| 20 | 7.22 | 6.49 | 8.02 | 7.56 | 8.9  | 7.83 | 7.19 |
| 21 | 8.22 | 7.69 | 8.88 | 8.19 | 8.99 | 8.69 | 8.34 |
| 22 | 7.62 | 7.33 | 7.24 | 7.58 | 7.94 | 7.62 | 8.05 |
| 23 | 8.16 | 8.00 | 8.28 | 8.81 | 8.98 | 8.52 | 8.25 |
| 24 | 8.48 | 8.08 | 9.19 | 8.42 | 8.24 | 8.47 | 8.39 |
| 25 | —    | 8.76 | 9.10 | 8.88 | 9.05 | 9.1  | 8.9  |
| 26 | 9.25 | 8.8  | 8.68 | 9.00 | 8.38 | 8.74 | 7.57 |
| 27 | 9.43 | 9.01 | 9.26 | 8.54 | 9.77 | 9.86 | 9.06 |
| 6  | 8.1  | 6.17 | 6.53 | 6.91 | 8.72 | 7.54 | 6.61 |

The invention has been described in detail with reference to its preferred embodiments and its example. However, it will be apparent that numerous variations and modifications can be made without departure from the spirit and scope of the invention as described in the foregoing detailed specification and claims.

That which is claimed:

1. A polyetherester-based laminating resin composition comprising:
    an unsaturated polyetherester resin; and
    an epoxy acrylate oligomer;
    wherein said laminating resin comprises no greater than about 35 percent by weight of ethylenically unsaturated monomer.

2. The laminating resin composition according to claim 1, wherein said unsaturated polyetherester resin has less than about 20 percent saturated aromatic groups based on the number of unsaturated ester groups in the polyetherester resin.

3. The laminating resin composition according to claim 1, wherein said epoxy acrylate oligomer is an epoxy (meth) acrylate oligomer.

4. The laminating resin composition according to claim 1, wherein said laminating resin composition has an acid number of no greater than about 20.

5. The laminating resin composition according to claim 1, wherein said laminating resin composition further comprises a dicyclopentadiene resin.

6. The laminating resin composition according to claim 5, wherein said dicyclopentadiene resin has a number average molecular weight ranging from about 450 to about 1500.

7. An article of manufacture comprising the laminating resin composition as recited in claim 1 and a fibrous substrate.

8. The article of manufacture according to claim 7, wherein the fibrous substrate comprises fibers selected from the group consisting of fibrous glass, carbon fibers, aromatic polyamide fibers, inorganic fibers, and mixtures thereof.

9. A polyetherester-based laminating resin composition comprising:
    from about 10 to about 70 percent by weight of an unsaturated polyetherester resin; and
    from about 5 to about 50 percent by weight of an epoxy acrylate oligomer; and
    wherein said laminating resin composition comprises no greater than about 35 percent by weight of ethylenically unsaturated monomer.

10. The laminating resin composition according to claim 9, wherein said unsaturated polyetherester resin has less than 20 percent saturated aromatic groups based on the number of unsaturated ester groups in the polyetherester resin.

11. The laminating resin composition according to claim 9, wherein said epoxy acrylate oligomer is an epoxy (meth) acrylate oligomer.

12. The laminating resin composition according to claim 9, wherein said laminating resin composition further comprises a dicyclopentadiene resin.

13. The laminating resin composition according to claim 12, comprising from about 5 to about 50 percent by weight of said dicyclopentadiene resin.

14. The laminating resin composition according to claim 12, wherein said dicyclopentadiene resin has a number average molecular weight ranging from about 450 to about 1500.

15. The laminating resin composition according to claim 9, wherein said laminating resin composition has an acid number of no greater than 20.

16. An article of manufacture comprising the laminating resin composition as recited in claim 8 and a fibrous substrate.

17. The article of manufacture according to claim 16, wherein the fibrous substrate comprises fibers selected from the group consisting of fibrous glass, carbon fibers, aromatic polyamide fibers, inorganic fibers, and mixtures thereof.

18. A method of forming an article of manufacture comprising:
    applying a laminating resin composition to a fibrous substrate to form an article of manufacture, the laminating resin composition comprising an unsaturated polyetherester resin; and a dicyclopentadiene resin; and wherein the laminating resin comprises no greater than about 35 percent by weight of ethylenically unsaturated monomer.

19. The method according to claim 18, wherein said step of applying the laminating resin composition comprises spraying the laminating resin composition onto the fibrous substrate.

20. The method according to claim 18, wherein said step of applying the laminating resin composition comprises brushing the laminating resin composition onto the fibrous substrate.

* * * * *